(12) United States Patent
Benedetti

(10) Patent No.: US 6,591,888 B2
(45) Date of Patent: Jul. 15, 2003

(54) COVERING AND PROTECTING DEVICE FOR MACHINERY

(75) Inventor: Michele Benedetti, Bologna (IT)

(73) Assignee: P.E.I. Protezioni Elaborazioni Industriali S.r.L., Bologna (IT)

( * ) Notice: Subject to any disclaimer, the term of this patent is extended or adjusted under 35 U.S.C. 154(b) by 0 days.

(21) Appl. No.: 09/880,416

(22) Filed: Jun. 13, 2001

(65) Prior Publication Data

US 2001/0052398 A1 Dec. 20, 2001

(30) Foreign Application Priority Data

Jun. 15, 2000 (IT) .................................... BO2000A0354

(51) Int. Cl.[7] ................................................ E06B 9/08
(52) U.S. Cl. ........................ 160/235; 160/122; 160/133
(58) Field of Search .................... 160/122, 133, 160/241, 235, 236, 233, 234; 74/566, 608; 384/15, 16; 409/134

(56) References Cited

U.S. PATENT DOCUMENTS

| | | | | |
|---|---|---|---|---|
| 2,850,332 A | * | 9/1958 | Begle | .......................... 384/15 |
| 3,475,064 A | * | 10/1969 | O'Rourke | ..................... 384/15 |
| 4,341,253 A | * | 7/1982 | Eyerle | ......................... 160/133 |
| 4,343,340 A | * | 8/1982 | Paule | ......................... 160/232 |
| 4,628,646 A | * | 12/1986 | Eyerle | ......................... 160/133 |
| 5,235,874 A | * | 8/1993 | Tabellini | ................... 384/15 X |
| 6,276,427 B1 | * | 8/2001 | Eisner | ......................... 160/133 |

* cited by examiner

Primary Examiner—David M. Purol
(74) Attorney, Agent, or Firm—Fay, Sharpe, Fagan, Minnich & McKee, LLP

(57) ABSTRACT

A device for covering and protecting machinery has at least one covering and protective surface and a plurality of modular elements positioned side by side. Each modular element has a central body, on opposite sides of which there extend first and second lateral protrusions, respectively. The ends of the first and second protrusions of two adjacent modular elements overlap in such a way as to form a T shape, and are connected to each other by a cylindrical hinge positioned between them. Each central body, together with at least the first or the second lateral protrusion forms a corresponding portion of the covering and protecting surface, and the surface portions formed by the modular elements are placed side by side in contact with each other so as to make a substantially uninterrupted covering and protecting surface.

20 Claims, 3 Drawing Sheets

COVERING AND PROTECTING DEVICE FOR MACHINERY

BACKGROUND OF THE INVENTION

The present invention relates to a covering and protecting device for machinery.

The invention can be used for many industrial applications and relates in particular to a covering and protecting device comprising a surface designed to cover and protect a channel of an automatic machine or machine tool.

In the present specification, reference is made, without restricting the scope of the invention, to covering and protecting devices in which said surface is a walk-on surface designed to cover and protect a channel made in the bottom of the bed of an automatic machine or machine tool.

The bed of a large piece of machinery usually has one or more channels made in the bottom of it forming respective guides for moving parts or devices of the machine. These channels are often covered and protected by devices in which the walk-on surface consists of a roll up guard formed of a continuous stainless steel belt.

During operation of the machine, the mobile device or part moves along the channel, rolling up or unrolling the belt as it does so in such a way as to close the top of the channel not only to protect the contents of the channel, for example from shavings, swarf, liquids, and other process materials, but also to allow the operator to safely walk or stand on the channel.

Instead, when the machine is not working, the belt may be rolled up to uncover the channel so as to allow maintenance to be carried out on the parts inside.

To confer strength and good load-bearing capacity on the above mentioned walk-on guard, the steel belt is supported on the underside of it by a plurality of rigid, modular, transversal bars positioned side by side and fixed to the belt on the other side of the guard. Each bar has a long central body with a U-shaped cross section, and two lateral wings running lengthways alongside the central body. In other terms, the central body has a flat rectangular wall, from which two flat rectangular walls forming the sides of the bar extend at right angles, and the lateral wings have flat rectangular surfaces which extend outwards at right angles to the sides of the bar body and which are designed to be attached by means of adhesive and/or rivets to the belt on the side opposite the walk-on surface.

The bars are fixed to the belt at defined intervals, leaving a suitable spacing between them, in such a way as to enable the belt to be rolled up.

The disadvantage of a device of this kind is that its construction is complex and expensive. Moreover, the belt tends to wear easily on account of the continual rolling and unrolling. This, after a time, gives rise to warping in the parts of the belt located between consecutive bars and may even cause some of the bars to come away from the belt.

SUMMARY OF THE INVENTION

The aim of the present invention is to provide covering and protecting device that overcomes the disadvantages described above with reference to the prior art.

Accordingly, the present invention provides a covering and protecting device for machinery, said device being of the type that comprises: at least one covering and protecting surface; a plurality of long modular elements positioned side by side, each modular element having a central body, a first protrusion and a second protrusion both extending lengthways alongside the central body on opposite sides of it; and connecting means between each consecutive pair of modular elements designed to connect the first protrusion of one modular element to the second protrusion of the other modular element; wherein said first and second protrusions of two consecutive modular elements have overlapping ends; the connecting means being positioned between said ends; each of the modular elements forming a corresponding portion of the surface; the portions being positioned side by side in contact with each other to make the surface substantially uninterrupted.

Each portion is preferably formed by the central body and by at least the first or the second protrusion of each modular element.

BRIEF DESCRIPTION OF THE DRAWINGS

The invention will now be described with reference to the accompanying which illustrates a preferred embodiment and in which.

DESCRIPTION OF THE PREFERRED EMBODIMENTS

Figure 1:
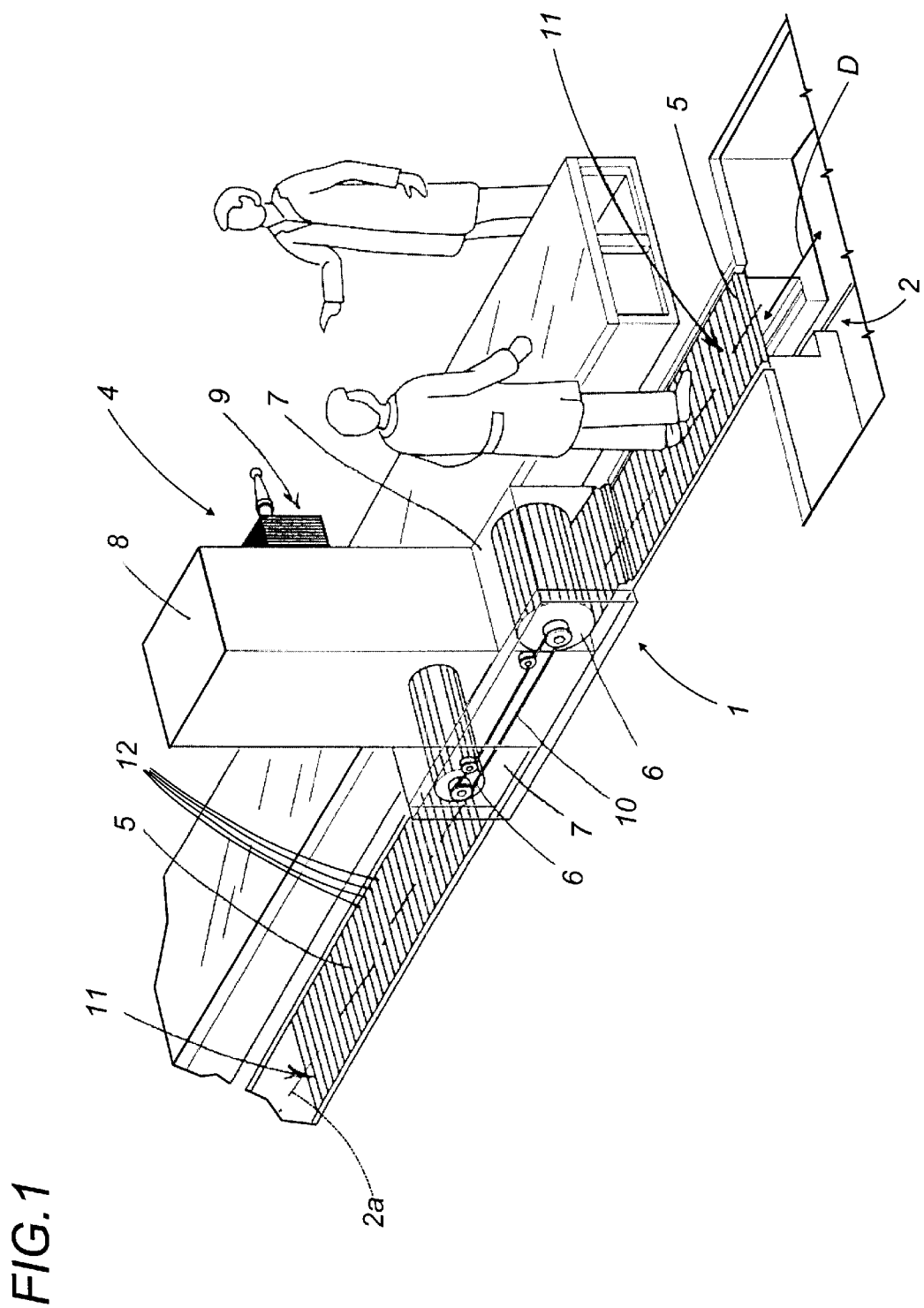
FIG. 1 is a schematic perspective view, with some parts cut away for clarity, of a factory machine equipped with the covering and protecting device according to an embodiment of the present invention.

With reference to FIG. 1, the numeral 1 denotes in its entirety a device for covering and protecting a channel 2 made in the bed 3 of a typical factory machine 4.

The device 1 comprises two protecting and covering roll up surfaces formed of corresponding walk-on shutters 5 designed to be positioned over the channel 2 in order to protect the channel 2 while at the same time allowing the operators of the machine 4 to walk or stand on the channel.

The device 1 also comprises two rollers 6 for rolling and unrolling the shutters 5. The rollers 6 are mounted in sheet metal boxes 7 and are attached to an upright 8 of a conventional operating unit or tool holder 9 which runs lengthways along the channel 2 in a direction D parallel to the longitudinal axis 2a of the channel 2 itself.

The device 1 further comprises a conventional compensating chain 10 to coordinate the rolling and unrolling motion of the two rollers 6 with the lengthways motion of the unit 9 in the direction D. Thus, as the unit 9 moves in the direction D, both the shutters 5 form corresponding covering and protecting surfaces 11 which, when rolled out flat, are stationary and suitable for walking or standing on.

Each shutter 5 comprises a plurality of long modular elements 12 made of extruded aluminum. The elements 12 are positioned side by side and are designed to be placed over the channel 2 transversally relative to the aforementioned axis 2a.

Figure 2:
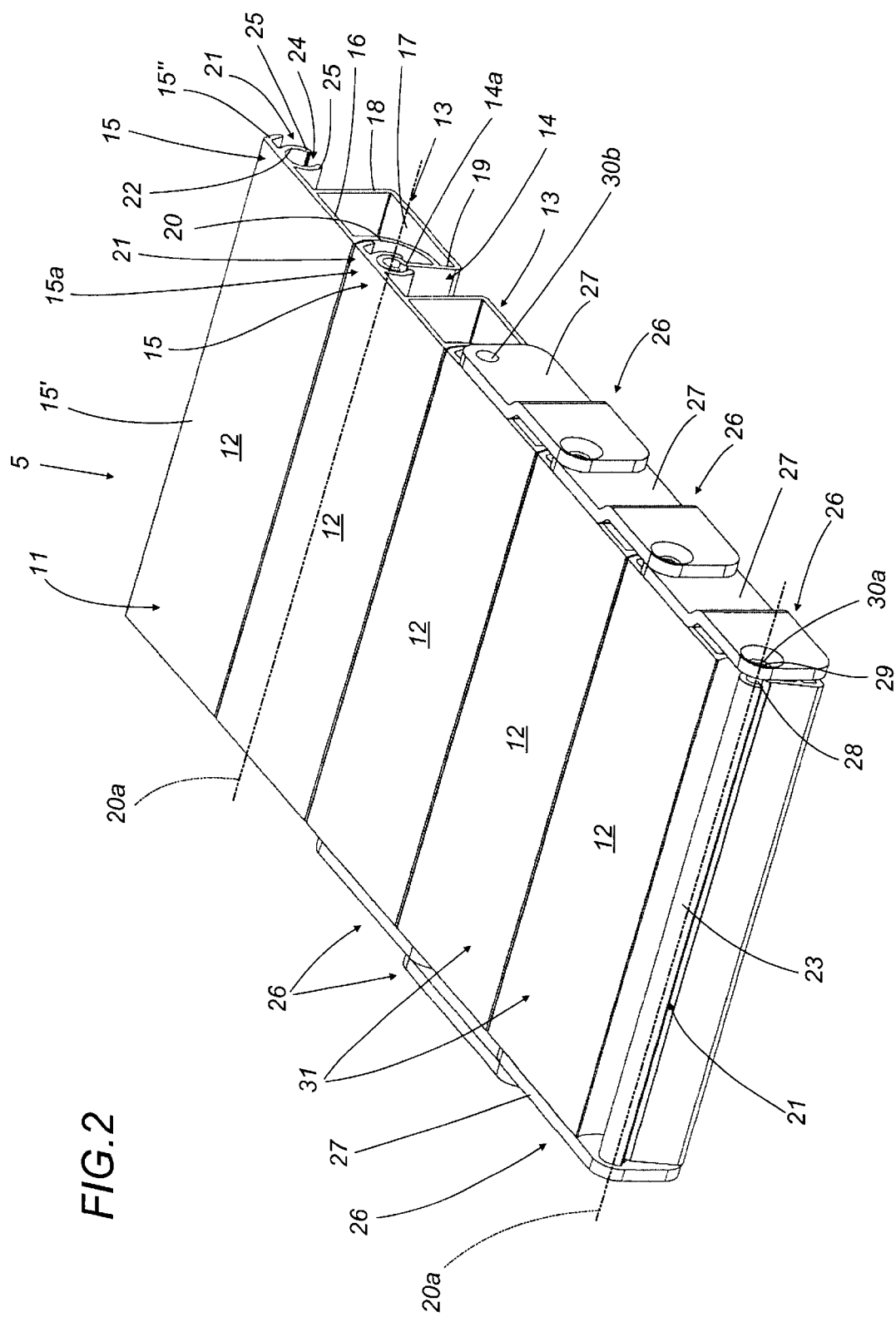
FIG. 2 is a perspective view, with some parts cut away for clarity, of a part of the covering and protecting device illustrated in FIG. 1.
Figure 3:
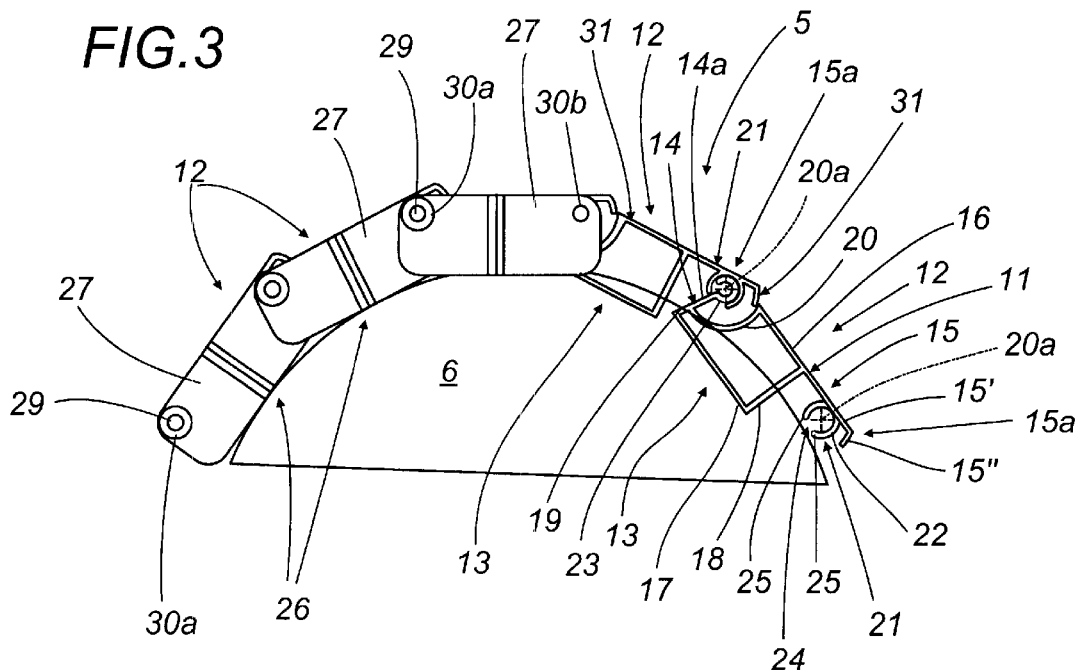
FIGS. 3 and 4 are side elevations, with some parts cut away for clarity, of a further two details of the covering and protecting device illustrated in FIG. 1.
Figure 4:
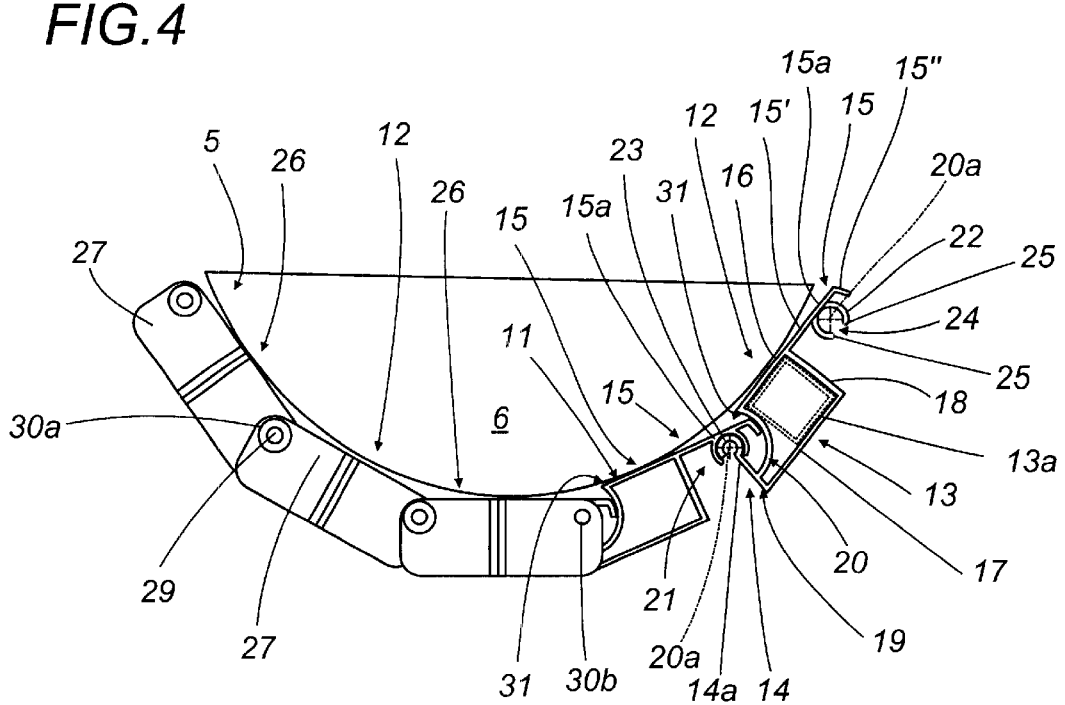

As shown in more detail in FIGS. 2, 3 and 4, each element 12 comprises a central tubular body 13, a first protrusion and a second protrusion, labeled 14 and 15, respectively, which are positioned next to the body 13. Looking in more detail, the protrusions 14 and 15 extend lengthways alongside the body 13 and on opposite sides of the body 13 itself.

The body 13 has a small, plane rectangular wall 16 and a large plane rectangular wall 17 parallel to and facing each other, a plane rectangular sidewall 18 extending at right angles to the walls 16 and 17, a plane rectangular sidewall 19 extending from the wall 17 and slightly inclined towards the wall 18, and a curved wall 20 joining the walls 16 and 19. Looking in more detail, the wall 20 extends along an angular portion delimited by the periphery of a cylinder having a defined radius and an axis 20a positioned outside the body 13 and parallel to the walls 16 and 18.

The protrusion 14 consists of a plane, rectangular wall lying in the same plane as the wall 19 and extending from the edge formed by the walls 19 and 20. Looking in more detail, the aforementioned axis 2a lies in the same plane as wall 19 and the protrusion 14.

Instead, the protrusion 15 extends from the edge formed by the walls 16 and 18, and has a first plane, rectangular portion 15' extending in the same plane as wall 16 starting from the walls 16 and 18, and a second curved portion 15", which extends from the portion 15' on the opposite side of the wall 16, faces the wall 17 and has the same center and curvature radius as the wall 20 of the adjacent element 12.

As shown by the dashed line in FIG. 4, the central body 13 may have a reinforcing core 13a, made of steel for example.

Each shutter 5 further comprises a cylindrical hinge 21 placed between each pair of adjacent, modular elements 12 in such a way as to connect the first protrusion 14 of one modular element 12 to the second protrusion 15 of the other modular element 12.

The hinge 21 is positioned between the end 14a of the protrusion 14 on the side opposite the wall 19, and the end 15a of the protrusion 15 on the side opposite the wall 16. Looking in more detail, the hinge 21 is connected to the end 15a of protrusion 15 at the portion 15' and on the side of the portion 15' that faces the wall 17. When connected through the hinge 21, the ends 14a and 15a overlap in T fashion, while the hinge 21 extends parallel to the ends 14a and 15a along the aforementioned axis 20a.

The hinge 21 presents two concentric tubular elements 22 and 23 that lie on the same axis 20a. The outer tubular element, labeled 22, constitutes an intermediate transversal extension of the portion 15' facing the wall 17 of the related body 13, while the inner tubular element 23 constitutes a transversal extension of the end 14a.

The element 22 presents a longitudinal rectangular opening 24, which is delimited by two longitudinal edges 25 parallel to the axis 20a, and through which the end 14a can oscillate about the axis 20a within a defined range of angular values. The edges 25 thus constitute elements used to stop the rotation of the hinge 21 about the axis 20a.

Each pair of hinged modular elements 12 is equipped with an abutting element 26 used to stop the protrusions 14 and 15 joined together by the hinge 21 from moving axially relative to each other.

The element 26 comprises two plates 27 positioned on opposite sides of the pair of elements 12 along the axes 20a of the elements 12 themselves, and a cylindrical tubular element 28 which is longer than the elements 12 by twice the thickness of the plates 27, is fitted inside the tubular element 23 of the hinge 21, is positioned at right angles between the plates 27 and is fixed to the latter by screws 29 at corresponding through holes 30a made in the plates 27 themselves.

Each plate 27 has another through hole 30b whose center distance from the corresponding through hole 30a is equal to the distance between the axes 20a of two adjacent elements 12. The holes 30b in the plates 27 of an abutting element 26 are crossed by the tubular element 28 of the adjacent tubular element 26. In this way, the plates 27 are chained together in a configuration such as to close the ends of the modular elements 12.

Each modular element 12 forms a portion 31 of the aforementioned covering and protecting surface 11. The portion 31 is in turn formed by the protrusion 15 and the central body 13.

Both when the shutter 5 lies flat in its unrolled position (FIGS. 1 and 2), and when the shutter 5 lies curved in its rolled up position (FIGS. 3 and 4), the portions 31 are positioned side by side in a configuration of substantial contact with each other so that the aforementioned surface 11 is substantially uninterrupted.

When the shutter 5 lies flat in its unrolled position, the plane portion 15' of one modular element 12 lies in the same plane as the wall 16 of the modular element 12 adjacent to it at a substantially zero distance so as to guarantee reciprocal contact between the portions 31 and the substantial regularity of the surface 11. In this condition, the surface 11 is flat and can be walked on and is formed by the portions 15' alternated with the walls 16.

When the shutter 5 passes from the unrolled position to the rolled up position, the aforementioned curved portion 15" of one modular element 12 slides on the curved wall 20 of the modular element 12 adjacent to it, again guaranteeing the reciprocal contact between the portions 31 and the substantial regularity of the surface 11. In this case, obviously, the surface 11 cannot be walked on and is formed by the portions 15' alternated with the walls 16 by means of corresponding steps formed by the portions 15" (FIG. 3) or by the walls 20 (FIG. 4).

It is therefore clear that the shutter 5, in any condition, whether rolled out flat or rolled up, forms a regular covering and protecting surface 11 without any undesirable gaps in it. Moreover, the concatenated plates 27 of the abutting elements 26 guarantee complete closure of the shutter 5 along the edges.

The invention described can be subject to modifications and variations without thereby departing from the scope of the inventive concept. Moreover, all the details of the invention may be substituted by technically equivalent elements.

What is claimed:

1. A covering and protecting device for machinery, comprising: at least one covering and protecting surface; a plurality of long modular elements positioned side by side, each modular element having a central body, a first protrusion and a second protrusion both extending lengthways alongside the central body on opposite sides of it; and connecting means between each consecutive pair of modular elements, to connect the first protrusion of one modular element to the second protrusion of the other modular element; wherein the first and second protrusions of two consecutive modular elements have overlapping ends; the connecting means being positioned between said ends; each of the modular elements forming a corresponding portion of the surface; and the portions being positioned side by side and in contact with each other to make the surface substantially uninterrupted, both when the device lies flat in its unrolled position and when the device lies curved in its rolled up position, wherein each modular element comprises:

a curved wall located nearby the first protrusion and extending along an angular portion; and, a curved portion positioned on the second protrusion and acting in contact relationship with the curved wall of an adjacent modular element, both when the device lies in its unrolled position and in its rolled up position, to define said substantially uninterrupted surface.

2. The device according to claim 1, wherein the portion of the covering and protecting surface is formed by the central body and by at least the first or the second protrusion.

3. The device according to claim 1, wherein the overlapping ends are positioned relative to each other, to form a T shape.

4. The device according to claim 1, wherein the connecting means comprise a cylindrical hinge positioned between the overlapping ends and extending parallel to said overlapping ends.

5. The device according to claim 4, comprising first stop means for limiting the relative rotation of the first and second protrusions of two adjacent modular elements to within a defined range of angular values.

6. The device according to claim 4, comprising second means for stopping the first and second protrusions of two adjacent modular elements from moving axially relative to each other.

7. The device according to claim 1, wherein the central body is tubular in shape.

8. The device according to claim 7, wherein the tubular central body comprises a reinforcing core.

9. The device according to claim 1, wherein the modular elements together form a roll up protecting and covering shutter.

10. The device according to claim 2, wherein the overlapping ends are positioned relative to each other to form a T shape.

11. The device according to claim 2, wherein the connecting means comprise a cylindrical hinge positioned between the overlapping ends and extending parallel to said overlapping ends.

12. The device according to claim 3, wherein the connecting means comprise a cylindrical hinge positioned between the overlapping ends and extending parallel to said overlapping ends.

13. The device according to claim 5, comprising second means for stopping the first and second protrusions of two adjacent modular elements from moving axially relative to each other.

14. The device according to claim 2, wherein the central body is tubular in shape.

15. The device according to claim 3, wherein the central body is tubular in shape.

16. The device according to claim 4, wherein the central body is tubular in shape.

17. The device according to claim 5, wherein the central body is tubular in shape.

18. The device according to claim 6, wherein the central body is tubular in shape.

19. The device according to claim 2, wherein the modular elements together form a roll up protecting and covering shutter.

20. The device according to claim 3, wherein the modular elements together form a roll up protecting and covering shutter.

* * * * *